Patented Apr. 29, 1952

2,594,498

UNITED STATES PATENT OFFICE 2,594,498

COMPOSITION CONSISTING OF POLYVINYL ALCOHOL AND TRIMETHYLENE GLYCOL

Abbott M. Rohn, Detroit, Mich.

No Drawing. Application November 15, 1948, Serial No. 60,167

2 Claims. (Cl. 260—33.4)

This invention relates generally to a resinous composition produced from a water soluble resin and a glycol to yield an end product having reduced water susceptibility and increased flexibility. It more particularly relates to a treatment which is capable of rendering improved physical properties to a hydrophilic colloid, regardless of the wet or dry state of the latter.

The treatment in accordance with my invention involves the use of polyvinyl alcohol. However other hydrophilic colloids can be used with equal effectiveness for example water soluble or water dispersible cellulose derivatives such as hydroxy ethyl cellulose, salts of carboxy methyl cellulose, methyl cellulose; such adhesive substances derived from natural sources as gum arabic, natural gums, Irish moss; proteinaceous materials like animal glue, gelatin and casein. These water soluble or water dispersible film-forming agents listed are illustrative of materials compatible with trimethylene glycol. Therefore whenever a hydrophilic colloid compatible with trimethylene glycol is hereinafter referred to in the specification or claims, it is intended to include in such term any of the materials above identified. Trimethylene glycol is known in the art as 1,3 propanediol or 1,3 dihydroxy propane.

More specifically my invention consists in a resinous composition of polyvinyl alcohol and trimethylene glycol, which retains desirable characteristics of the former together with improved characteristics such as a higher water resistance and greater flexibility.

The polyvinyl alcohol of commerce is not a single chemical entity but a distinct class of polymeric materials. A given sample of polymer invariably contains chains of different lengths in which a measured degree of polymerization represents an average value. This resin may be produced by various processes, but more commonly by a saponification of polyvinyl acetate or occasionally from polyvinyl chloride. Deacetylation of polyvinyl acetate may be partial or complete resulting in polymers having relative amounts of hydroxyl and acetyl groups. It is known to those experienced in the art that the properties of a given polyvinyl alcohol are a function of the average degree of polymerization of the starting polyvinyl acetate and also of the extent of the hydrolysis. Since polyvinyl alcohol may contain esterified groups in conjunction with hydroxyl groups, it is recognized as a polyvinyl alcohol of commerce providing sufficient hydroxyl groups are present so as to permit its solubility in water, hot or cold.

My improved product is obtained by plasticizing polyvinyl alcohol with trimethylene glycol in amounts from 10–100 per cent based on the polyvinyl alcohol solids content. In the process of manufacture the trimethylene glycol may be admixed with polyvinyl alcohol by (1) under efficient agitation, addition of the plasticizer to a solution of resin when at a temperature at 80° C. and then holding at that temperature for approximately 20–30 minutes; (2) under efficient agitation, addition of the plasticizer to a solution of resin at room temperature, or at a lower temperature, subsequent elevation of the mass to 80° C. and then holding at this temperature for a period of approximately 20–30 minutes; (3) under efficient agitation, addition of the plasticizer to the dry resin and the mass then gradually added (in toto) within 5–10 minutes to water maintained at 80° C., after the last amount of the mass has been added, the process should be continued for a period of 45–60 minutes; and (4) under efficient agitation, addition of the plasticizer to the dry resin and the mass then gradually added (in toto) to water, bringing the batch to 80° C. and then holding for 45–60 minutes.

The following are structural formulas of the two ingredients,

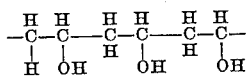

Polyvinyl alcohol

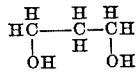

Trimethylene glycol

By reason of the similarity of the structural formulas of these two ingredients, they are compatible with each other.

The product thus obtained exhibits such rubber-like characteristics as flexibility, elasticity and resilience with toughness, high tensile strength and resistance to pressure, torsion and impact. Conversely it manifests such rubber-unlike characteristics as outstanding resistance to gasoline, greases, oils, organic solvents and being immune to aging. In its uncompounded state, films of polyvinyl alcohol are brittle and suffer dimensional instability. However, with my improved product these undesirable characteristics are largely eliminated, and in addition has high water resistance and increased flexibility.

What I claim as my invention is:
1. A resinous composition consisting of polyvinyl alcohol and from 10 to 100 per cent of trimethylene glycol based on polyvinyl solids content.
2. A resinous composition consisting of polyvinyl alcohol and not less than 40 per cent of trimethylene glycol based on polyvinyl solids content, said composition having little or no water sensitivity and adequate flexibility.

ABBOTT M. ROHN.

REFERENCES CITED

The following references are of record in the file of this patent:

UNITED STATES PATENTS

| Number | Name | Date |
|---|---|---|
| 2,133,257 | Strain | Oct. 11, 1938 |
| 2,351,301 | Sonnichsen | June 13, 1944 |
| 2,435,950 | Neher | Feb. 10, 1948 |